(12) United States Patent
Lin et al.

(10) Patent No.: US 6,627,672 B1
(45) Date of Patent: Sep. 30, 2003

(54) UV/MOISTURE DUAL CURE SILICONE POTTING COMPOUND WITH IMPROVED DEPTH OF CURE

(75) Inventors: Chiu-Sing Lin, Rocky Hill, CT (US); Thomas Fay-Oy Lim, Killingworth, CT (US); Richard Oliver Angus, Jr., Cromwell, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/858,364

(22) Filed: May 16, 2001

(51) Int. Cl.[7] .............................. C08F 2/46; C08F 2/50
(52) U.S. Cl. ............................ 522/99; 522/18; 522/28; 522/38; 522/64; 522/172; 522/148; 522/182; 528/30; 528/32; 528/33
(58) Field of Search .............................. 522/18, 28, 38, 522/64, 99, 172, 25, 31, 33, 15, 182, 148; 528/30, 33, 32

(56) References Cited

U.S. PATENT DOCUMENTS

| 4,265,723 A | * | 5/1981 | Hesse et al. ................... 522/16 |
| 4,298,738 A | * | 11/1981 | Lechtken et al. ............. 546/22 |
| 4,528,081 A | | 7/1985 | Lien et al. |
| 4,699,802 A | | 10/1987 | Nakos et al. |
| 4,710,523 A | * | 12/1987 | Lechtken et al. ............. 522/14 |
| 4,792,632 A | | 12/1988 | Ellrich et al. |
| 5,300,608 A | | 4/1994 | Chu et al. |
| 5,318,850 A | * | 6/1994 | Pickett et al. ................ 428/412 |
| 5,539,012 A | | 7/1996 | Klemarczyk et al. |
| 5,663,269 A | | 9/1997 | Chu et al. |
| 6,140,444 A | | 10/2000 | Levandoski et al. |
| 6,207,727 B1 | | 3/2001 | Beck et al. |
| 6,323,253 B1 | * | 11/2001 | Bennington ................... 522/16 |

OTHER PUBLICATIONS

Principles Of Polymerization, Odian, George, McGraw–Hill Book Company, NY, 1970.

* cited by examiner

Primary Examiner—James J. Seidleck
Assistant Examiner—Sanza L. McClendon
(74) Attorney, Agent, or Firm—Steven C. Bauman

(57) ABSTRACT

This invention relates to a dual curing silicone composition with an enhanced depth of cure. This composition incorporates an acylphosphine oxide or diacylphosphine oxide, the compatibility of which with the silicone is promoted through the use of a polar carrier. The composition may also include a second photoinitiator that is different than the acylphosphine oxide.

39 Claims, No Drawings

UV/MOISTURE DUAL CURE SILICONE POTTING COMPOUND WITH IMPROVED DEPTH OF CURE

BACKGROUND OF THE INVENTION

1. Field of the Invention

This invention relates to dual curing silicone compositions. More specifically, this invention relates to dual curing silicone compositions that achieve an improved depth of cure through the incorporation of photoinitiators which have heretofore not been compatible with silicones.

2. Brief Description of Related Technology

A variety of silicone compositions have been developed that may be used as sealants, conformal coatings, potting compounds, and the like. Among the numerous silicone compositions that have evolved, some depend on atmospheric humidity and/or moisture to be present on the substrate to which the composition is applied, for their cure. Although such moisture-curing silicone systems provide good physical properties and performance when fully cured, they suffer the disadvantage that the moisture curing process is relatively slow.

In consequence, silicone compositions that depend on other curing processes have been developed which are significantly faster than the moisture-curing process. In particular, photo-curable (e.g., UV-curable) silicones have been developed which offer a fast curing speed, far superior to conventional moisture-curing silicone. These silicone compositions may include a photoinitiator that provides a faster and more effective cure. Silicone compositions that are both moisture-curable and photo-curable have also been developed that provide a rapid cure. Examples of these are described in U.S. Pat. No. 5,663,269 to Chu, et al. (Chu); U.S. Pat. No. 6,140,444 to Levandoski, et al., (Levandoski); U.S. Pat. No. 4,528,081 to Lien et al. (Lien) and U.S. Pat. No. 4,699,802 to Nakos et al. (Nakos), all of which are hereby expressly incorporated herein by reference.

Conventional photo- and/or dual curing silicones have shown only limited depth of cure. Many applications, such as potting and gap filling of electronic components require compositions which can effectively cure through relatively large depths or volumes. Also, many conventional photoinitiators, such as 2,2-diethoxyacetophenone, are UV curable, but not curable by visible light.

While a variety of different photoinitiators are generally known as being useful for curing silicones, none are known to have produced a substantial increase in cure-through-volume (CTV) or depth of cure. Successful increases in depth of cure have been reported for non-silicone compositions. For example, U.S. Pat. No. 6,207,727 to Beck et al. discloses a photoinitiator combination of an acyl- or diacylphosphine oxide and a benzophenone in non-silicone ethylenically unsaturated compounds, such as $C_1$-$C_{20}$-alkyl (meth)acrylates, vinylaromatic compounds having up to 20 carbons, vinylesters of carboxylic acids containing up to 20 carbons, vinylesters of carboxylic acids containing up to 20 carbons, ethylenically unsaturated nitriles, vinyl ethers of $C_1$-$C_{10}$-alcohols, and aliphatic hydrocarbons having 2 to 8 carbons and 1 or 2 double bonds. While this patent alleges improved depth of cure for these materials, the acyl- or diacylphosphine oxide photoinitiators used therein are not normally compatible with silicones.

There is a need for silicone compositions that have improved depth of cure. There is further a need for a photoinitiator composition that is compatible with silicones and provides for enhanced depth of cure.

SUMMARY OF THE INVENTION

For purposes of this invention, cure-through-volume (CTV), cure-through-depth (CTD) and depth of cure will be used interchangeably.

One aspect of the present invention relates to a photocurable silicone composition having enhanced cure-through-volume/depth that includes a photocurable silicone component, at least one of an acylphosphine oxide, a diacylphosphine oxide or a combination thereof, and at least one polar carrier. A second photoinitiator may also be added to the composition. Desirably, the silicone composition is a dual photo- and moisture curing composition.

Another aspect of the present invention relates to a photocurable or dual photo/moisture curable silicone composition that is the reaction product of a photocurable silicone component, an acylphosphine oxide, a diacylphosphine oxide or a combination thereof, and at least one polar carrier. A second photoinitiator may also be added to the composition.

The present invention also provides a photoinitiator composition that includes at least two different photoinitiators. The first photoinitiator includes an acylphosphine oxide, a diacylphosphine oxide or a combination thereof, and the second photoinitiator may include conventional UV and visible light initiators. Examples are acetophenones, substituted acetophenones, benzoin and its alkyl esters, xanthone, substituted xanthones, camphoroquinone peroxyester initiators, 9-fluorene carboxylic acid peroxyester initiators and alkyl thioxanthones, such as isopropyl thioxanthone, and combinations thereof.

A further aspect of the present invention provides a photoinitiator composition compatible with silicones that includes an acylphosphine oxide or a diacylphosphine oxide, a second photoinitiator different from the first, and a polar carrier.

A method of preparing a photocuring or dual photo/moisture curing silicone composition is also provided. The method includes first preparing a premix of an acylphosphine oxide or a diacylphosphine oxide or a combination thereof and a polar carrier; and optionally adding thereto a second photoinitiator that is different than the first photoinitiator. The premix is then added to a photocurable silicone component.

In a still further aspect of the present invention there is provided a method of producing a silicone which cures through a cure-through-depth of about 4.0 mm or greater. The method includes first preparing a premix of an acylphosphine oxide or a diacylphosphine oxide or a combination thereof and a polar carrier. The premix is then added to a curable silicone component.

In a still further aspect of the present invention there is provided a dual curing silicone potting composition that includes a dual photo/moisture curable silicone component, at least two different photoinitiators, one of which is either an acylphosphine oxide or a diacylphosphine oxide or a combination thereof, a polar carrier, and a moisture cure catalyst.

DETAILED DESCRIPTION OF THE INVENTION

For purposes of this invention, the term (meth)acryl or (meth)acrylate will refer to both methacrylate and acrylate species.

The present invention is directed to a curable silicone composition that demonstrates an enhanced cure-through-depth capability upon cure. The composition includes a curable silicone component, an acylphosphine oxide photoinitiator and a polar carrier. The acylphosphine oxide may be an acylphosphine oxide or a diacylphosphine oxide, such as diphenyl (2,4,6-trimethylbenzoyl)phosphine oxide, or a combination thereof.

The curable silicone component of the present invention may be any suitable curable silicone component. These may include the silicones described in the aforementioned Chu and Levandoski patents such as those with the general formula I as shown below:

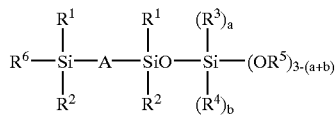

where A represents a polymer or copolymer backbone, which can be any number of combinations of polyurethane, silicone, polyamide, polyether, polyester and the like; $R^1$ and $R^2$ may be the same or different and are monovalent hydrocarbyl groups having up to 10 carbon atoms ($C_{1-10}$), or halo- or cyano-substituted hydrocarbyl groups; $R^3$ and $R^4$ may be the same or different monovalent groups and may contain an ethylenically unsaturated polymerizable double bond; $R^5$ is a methyl, ethyl, isopropyl or —$CH_2CH_2OCH_3$; a is 0, 1 or 2; b is 0, 1 or 2; a+b is 1 or 2; and $R^6$ is a monovalent hydrocarbyl group or

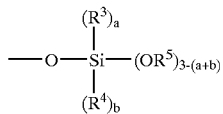

Most desirable silicones are those which have moisture and photocuring capabilities. Such desirable silicones conform to the formula.

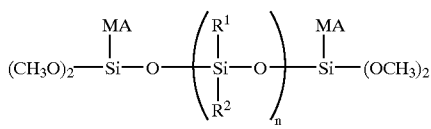

where MA is a methacryloxyalkyl group such as methacryloxypropyl, $R^1$ and $R^2$ are described as above, and n is from 1 to 1,200. While the curable silicone component may be made a variety of ways, one desirable method is that described in U.S. Pat. No. 5,663,269 to Chu.

The polar carrier of the present invention serves to promote compatibility of the phosphine oxide with the silicone component. Phosphine oxides are not generally soluble in or miscible with silicones and consequently were not useful in such compositions. In silicone compositions which have a high number of methacryl-containing groups present, solubility and/or miscibility is increased, but in such cases, only for relatively small amounts of phosphine oxide. Many commercially available silicone compositions do not have sufficient methacryl content as part of their polymer structure to allow for compatibility with sufficient phosphine oxide to provide a commercially viable product. The polar carrier may be selected from a wide variety of materials and may be unreactive or reactive with the curable silicone. The polar carrier is a desirably a reactive diluent which produces a compatible combination of the silicone with the phophine oxide. Suitable polar carriers include (meth)acrylate monomers, especially mono(meth)acrylates such as isobornyl acrylate, N,N dimethyl acrylamide, isooctyl acrylate, isodecyl acrylate, 2(2-ethoxyethoxy)ethylacrylate, and combinations thereof.

The amounts of each of the components may vary depending on the desired application. In general the amount of phosphine oxide may be in the range of about 0.01% to about 1.0% by weight of the total composition. The second, optimal photoinitiator may be present from about 0.01% to about 5.0% by weight of the total composition. The polar carrier may be present from about 0.5% to about 40% by weight of the total composition, desirably from about 0.5% to about 25% by weight of the total composition and even more desirably from about 0.5% to about 10% by weight of the total composition.

It has been discovered that use of the acyl- or diacylphosphine oxide within the polar carrier in the silicone composition provides a depth-of-cure that is generally greater than about 4.0 mm, and desirably greater than about 18.0 mm. In addition to UV radiation, the silicone may also be cured by radiation having a wavelength of 400 nm or longer in the visible light range.

The silicone component of the inventive composition may include reactive groups which cure by photoinitiation and/or exposure to moisture or heat. A mixture of silicones, each having a different cure mechanism may also be employed. Suitable moisture and/or heat catalysts are included where appropriate.

In one desirable aspect of the invention there is included a photocurable silicone composition which is the reaction product of a photocurable or dual curing silicone component, an acyl- or diacylphosphine oxide, and a polar carrier. Desirably, the phosphine oxide is diphenyl (2,4,6-trimethylbenzoyl)phosphine oxide. The polar carrier desirably includes a (meth)acrylate monomer, such as isobornyl acrylate, N,N dimethyl acrylamide, isooctyl acrylate, isodecyl acrylate, 2(2-ethoxyethoxy)ethylacrylate, and combinations thereof The composition may also include a second photoinitiator different than the acylphosphine oxide, including UV or visible light photoinitiators, such as those previously mentioned.

The photoinitiator component of the present invention may also include a combination of two different photoinitiators in a polar carrier, provided at least one of the photoinitiators is an acyl- or diacylphosphine oxide, such as diphenyl (2,4,6-trimethylbenzoyl)phosphine oxide. As stated above, phosphine oxide photoinitiators are normally not compatible, i.e., they are not miscible or combinable in a stable, homogeneous composition with silicones. The present invention includes a polar solvent in a sufficient amount to render the phosphine oxide alone or in combination with an additional photoinitiator compatible with the reactive silicone, i.e., fully or substantially miscible into a stable homogenous composition. The combination of the photoinitiators in the polar solvent is desirably added as a premix to the reactive silicone to promote uniformity and miscibility of the resultant composition.

The composition may also include a second photoinitiator. The second photoinitiator may be a UV or visible light photoinitiator and may be selected from a variety of known photoinitiators including benzophenones, acetophenones, substituted acetophenones, benzoin and its alkyl esters, xanthone, substituted xanthones, camphoroquinone peroxyester initiators, 9-fluorene carboxylic acid peroxyester initiators and alkyl thioxanthones, such as isopropyl thioxanthone, and combinations thereof.

Among the specific photoinitiators useful include 2,2 diethoxyacetophenone, benzyldimethyl ketal, 2,2-diethoxy-1,2-diphenylethanone, 1-hydroxy-cyclohexyl-phenyl ketone, α,α-dimethoxy-α-hydroxy acetophenone, 1-(4-isopropylphenyl)-2-hydroxy-2-methyl-propan-1-one, 1-[4-(2-hydroxyethoxy)phenyl]-2-hydroxy-2-methyl-propan-1-one, 2-methyl-1-[4-(methylthio)phenyl]-2-morpholino-propan-1-one, 2-benzyl-2-dimethylamino-1-(4-morpholinophenyl)-butan-1-one, 3,6-bis(2-methyl-2-morpholino-propanonyl)-9-butyl-carbazole, 4,4'-bis(dimethylamino)benzophenone, 2-chlorothioxanthone, 4-chlorothioxanthone, 2-isopropylthioxanthone, 4-isopropylthioxanthone, 2,4-dimethylthioxanthone, 2,4-diethylthioxanthone, 4-benzoyl-N,N-dimethyl-N-[2-(1-oxo-2-propenyl)oxy]ethylbenzenemethanaminium chloride, methyldiethanolamine, triethanolamine, ethyl 4-(dimethylamino)benzoate, 2-n-butoxyethyl 4-(dimethylamino)benzoate and combinations thereof. Desirably, the second photoinitiator is 2,2 diethoxyacetophenone.

Visible light photoinitiators may also be employed. Visible light photoinitiators include camphoroquinone peroxyester initiators, 9-fluorene carboxylic acid peroxyester initiators and alkyl thioxanthones, such as isopropyl thioxanthone.

The method of preparing the silicone composition includes preparing a premix of the photoinitiator systems by uniformly combining the two photoinitiator components and the polar carrier. The premixed photoinitiator system is added to the curable silicone component to form the final curable silicone composition. Other additives such as moisture cure catalysts may be added in a conventional manner.

The features and advantages of the present invention are more fully shown by the following examples which are provided for purposes of illustration, and are not to be construed as limiting the invention in any way.

EXAMPLE

Compositions A–F shown below are representative of dual curing silicone compositions of the present invention.

TABLE I

| Component | Weight % COMPOSITION | | | | | |
| --- | --- | --- | --- | --- | --- | --- |
| | A | B | C | D | E | F |
| 3-Methacryloxypropyl di-methoxy terminated poly-dimethylsiloxane (PDMS) | 69.00 | 69.00 | 69.00 | 68.00 | 69.05 | 69.07 |
| Vinyl dimethoxy terminated polydimethylsiloxane (PDMS) | 16.00 | 17.50 | 16.00 | 16.00 | 16.00 | 16.00 |
| Fumed silica | 3.25 | 1.75 | 3.25 | 4.25 | 3.25 | 3.25 |
| Isobornyl acrylate | 4.00 | 4.00 | 4.00 | 4.00 | 4.00 | 4.00 |
| N,N dimethyl acrylamide | 2.00 | 2.00 | 2.00 | 2.00 | 2.00 | 2.00 |
| Octyl/decyl acrylate | 1.00 | 1.00 | 1.00 | 1.00 | 1.00 | 1.00 |
| 2,2 Diethoxyacetophenone | 0.75 | 0.75 | 0.75 | 0.75 | 0.75 | 0.75 |
| Diphenyl (2,4,6-trimethyl-benzoyl)phosphine oxide | 0.10 | 0.10 | 0.10 | 0.10 | 0.05 | 0.03 |
| Methacryloxypropyl-trimethoxysilane | 1.00 | 1.00 | 1.00 | 1.00 | 1.00 | 1.00 |
| Alkyl tin carboxylate | 0.40 | 0.40 | 0.40 | 0.40 | 0.40 | 0.40 |
| Vinyltrimethoxysilane | 2.50 | 2.50 | 2.50 | 2.50 | 2.50 | 2.50 |

Each of the inventive compositions in Table I were made as follows. First the curable silicone components were heated to 50° C. and mixed under full vacuum. Nitrogen was then introduced to the mixer and the fumed silica was combined with the curable silicone component mixture at 50° C. for about 20 minutes. A vacuum was then applied and the components were allowed to mix for approximately another 30 minutes before being cooled to between about 25° C. and 30° C.

The photoinitiator system was then separately prepared. The photoinitiators and the polar carriers were then mixed under nitrogen for about 20 minutes to form a separate premix. This premix and remaining components shown in Table I were then added to the previously formed silicone mixture and blended for a sufficient time, approximately 20 minutes, to provide a uniform mixture.

TABLE II

| | Depth of cure (mm) | | | |
| --- | --- | --- | --- | --- |
| Composition | Initial | Week 1 | Week 2 | Week 3 |
| A | 16.3 | 15.6 | n/a | n/a |
| B | 19.5 | n/a | n/a | n/a |
| C | 16.0+ | 16.0+ | n/a | n/a |
| D | 16.0+ | n/a | n/a | n/a |
| E* | 18.3 | 18.5 | 18.5 | 18.2 |
| F* | 17.9 | 16.0+ | 16.0+ | 18.5 |

*Aged at 38° C., all others aged at 50° C.
n/a Measurement not taken

Each of the inventive compositions in Table I were subjected to accelerated aging tests at 50° C. for up to three weeks and observed for changes in viscosity. The aging data showed little change in viscosity, indicating that the compositions were stable after aging. The compositions were cured with a Fusion lamp equipped with a H bulb for 30 seconds at 180 mW/cm$^2$ (based on OAI 306 UV powermeter). As Table II indicates, the composition provided cure depths of 16 mm or greater. Furthermore, the compositions continued to provide cure depths of about 16.0 mm or greater after the uncured compositions had been subjected to accelerated aging.

As a further example, an inventive composition was made substantially identical to Composition A, but without the second photoinitiator. This composition included only diphenyl (2,4,6-trimethylbenzoyl)phosphine oxide and was found to provide a cure-through-depth of greater than about 15.8 mm.

Each of the inventive compositions were also found to be curable by visible light (e.g. wavelength greater than about 400 nm). The compositions were exposed to a visible light Fusion V bulb at 180 mW/cm$^2$ 30 sec. using a UV stabilized polycarbonate plaque to filter out the UVA/UVB radiation and cured equally well.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A curable silicone composition having enhanced cure-through-depth comprising:
   a. a curable silicone component; and
   b. a premix comprising an acylphosphine oxide and at least one polar carrier.

2. The composition of claim 1 wherein said acylphosphine oxide comprises diphenyl (2,4,6-trimethylbenzoyl) phosphine oxide.

3. The composition of claim 1 further comprising a second photoinitiator, different than said acylphosphine oxide.

4. The composition of claim 3 wherein said second photoinitiator is a UV or visible light photoinitiator.

5. The composition of claim 3 wherein said second photoinitiator is a member selected from the group consisting of benzophenones, acetophenones, substituted acetophenones, benzoin and its alkyl esters, xanthone, substituted xanthones, camphoroquinone peroxyesters, 9-fluorene carboxylic acid peroxyesters, alkyl thioxanthones, and combinations thereof.

6. The composition of claim 4 wherein said second photoinitiator comprises 2,2 diethoxyacetophenone.

7. The composition of claim 1 wherein said polar carrier comprises a (meth)acrylate monomer.

8. The composition of claim 1 wherein said carrier is selected from the group consisting of isobornyl acrylate, N,N dimethyl acrylamide, isooctyl acrylate, isodecyl acrylate, 2(2-ethoxyethoxy)ethylacrylate, and combinations thereof.

9. The composition of claim 1 wherein said carrier renders said acylphosphine oxide compatible with said silicone.

10. The composition of claim 1 wherein said carrier comprises from about 0.5% up to about 40% by weight of said composition.

11. The composition of claim 1 wherein said carrier comprises from about 0.5% up to about 10% by weight of said composition.

12. The composition of claim 3 wherein said second photoinitiator comprises from about 0.01% up to about 5.0% by weight of said composition.

13. The composition of claim 1 wherein said acylphosphine oxide comprises from about 0.01% to about 1.0% by weight of said composition.

14. The composition of claim 1 having a depth of cure greater than about 4.0 mm.

15. The composition of claim 1 having a depth of cure greater than about 18.0 mm.

16. The composition of claim 1 wherein said composition is curable by radiation having a wavelength in the UV or visible light spectrum.

17. The composition of claim 1 wherein said photocurable silicone component is also curable by a cure mechanism selected from the group consisting of moisture, heat or a combination thereof.

18. The composition of claim 17 further comprising a catalyst selected from the group consisting of a heat cure catalyst, a moisture cure catalyst and combinations thereof.

19. The composition of claim 1 further comprising a plasticizer and optionally comprising a filler.

20. A curable silicone composition comprising the reaction product of:
   a. a photocurable silicone component; and
   b. a premix comprising a first photoinitiator comprising an acylphosphine oxide and a polar carrier.

21. The composition of claim 20 wherein said photoinitiator comprises diphenyl (2,4,6-trimethylbenzoyl) phosphine oxide.

22. The composition of claim 20 further comprising an additional photoinitiator different than said acylphosphine oxide.

23. The composition of claim 22 wherein said additional photoinitiator is a UV or visible light photoinitiator.

24. The composition of claim 22 wherein said additional photoinitiator is a member selected from the group consisting of benzophenones, acetophenones, substituted acetophenones, benzoin and its alkyl esters, xanthone, substituted xanthones, camphoroquinone peroxyesters, 9-fluorene carboxylic acid peroxyesters, alkyl thioxanthones, and combinations thereof.

25. The composition of claim 20 wherein said polar carrier is selected from the group consisting of isobornyl acrylate, N,N dimethyl acrylamide, isooctyl acrylate, isodecyl acrylate, 2(2-ethoxyethoxy)ethylarylate, and combinations thereof.

26. The composition of claim 22 wherein:
   said carrier comprises from about 0.5% up to about 40% by weight of said composition;
   said second photoinitiator comprises from about 0.01% up to about 5.0% by weight of said composition; and
   said first photoinitiator comprises from about 0.01% up to about 1.0% by weight of said composition.

27. The composition of claim 20 having a depth of cure greater than about 4.0 mm.

28. The composition of claim 20 having a depth of cure greater than about 18.0 mm.

29. A photoinitiator composition comprising diphenyl (2,4,6-trimethylbenzoyl)phosphine oxide and 2,2 diethoxyacetophenone.

30. A photoinitiator composition compatible with silicones comprising diphenyl (2,4,6-trimethylbenzoyl) phosphine oxide, 2,2 diethoxyacetophenone, and a polar carrier.

31. The composition of claim 30 wherein said carrier is selected from the group consisting of isobornyl acrylate, N,N dimethyl acrylamide, isooctyl acrylate, isodecyl acrylate, 2(2-ethoxyethoxy)ethylacrylate, and combinations thereof, said first photoinitiator comprises (2,4,6-trimethylbenzoyl)phosphine oxide and said second photoinitiator is selected from the group consisting of benzophenones, acetophenones, substituted acetophenones, benzoin and its alkyl esters, xanthone, substituted xanthones, camphoroquinone peroxyesters, 9-fluorene carboxylic acid peroxyesters, alkyl thioxanthones, and combinations thereof.

32. A method of preparing a curable silicone composition having enhanced cure-through-depth, comprising adding a premix to a silicone component, said premix comprising an acylphosphine oxide and a sufficient amount of a polar carrier to make said phosphine oxide compatible with said silicone.

33. A method of producing a silicone composition which cures through a depth of about 4.0 mm or greater comprising adding a premix to a photocuring silicone component, said premix comprising an acylphosphine oxide and a sufficient amount of a polar carrier to make said phosphine oxide compatible with said silicone.

34. A dual photo/moisture curing silicone potting composition having enhanced cure-through-depth comprising:
   a. a photo/moisture curable silicone component;
   b. a premix comprising a first photoinitiator comprising an acylphosphine oxide, a second photoinitiator different than said first photoinitiator and at least one polar carrier; and
   c. a moisture cure catalyst.

35. The composition of claim 34 wherein said first photoinitiator comprises diphenyl (2,4,6-trimethylbenzoyl) phosphine oxide, said second photoinitiator comprises 2,2 diethoxyacetophenone, and said polar carrier is selected from the group consisting of isobornyl acrylate, N,N dimethyl acrylamide, isooctyl acrylate, isodecyl acrylate, 2(2-ethoxyethoxy)ethylacrylate, and combinations thereof.

36. A dual photo/moisture curing silicone composition having enhanced cure-through-depth comprising:
  a. a photo/moisture curable silicone component;
  b. a premix comprising a first photoinitiator comprising diphenyl (2,4,6-trimethylbenzoyl)phosphine oxide; a second photoinitiator selected from the group consisting of benzophenones, acetophenones, substituted acetophenones, benzoin and its alkyl esters, xanthone, substituted xanthones, and combinations thereof; and at least one polar carrier;
  c. optionally further comprising a moisture cure catalyst; and
  d. optionally further comprising a heat cure catalyst.

37. A dual photo/moisture curing silicone composition having enhanced cure-through-depth comprising:
  a. a photo/moisture curable silicone component;
  b. a premix comprising a first photoinitiator comprising diphenyl (2,4,6-trimethylbenzoyl)phosphine oxide; said first photoinitiator comprising from about 0.01% to about 1.0% by weight of said composition; a second photoinitiator 2,2 diethoxyacetophenone; said second photoinitiator comprising from about 0.01% to about 5.0% by weight of said composition; and at least one polar carrier, said carrier is selected from the group consisting of isobornyl acrylate, N,N dimethyl acrylamide, isooctyl acrylate, isodecyl acrylate, 2(2-ethoxyethoxy)ethylacrylate, and combinations thereof;
  c. optionally comprising a moisture cure catalyst; and
  d. optionally comprising a heat cure catalyst.

38. A curable silicone composition having enhanced cure-through-depth comprising:
  a. a photocurable silicone component; and
  b. a premix comprising a first photoinitiator comprising an acylphosphine oxide; a second photoinitiator different than said first photoinitiator; and at least one polar carrier.

39. A curable silicone composition comprising the reaction product of:
  a. a premix comprising a photocurable silicone component; and
  b. a first photoinitiator comprising an acylphosphine oxide; a second photoinitiator different than said first photoinitiator; and a polar carrier.

* * * * *

UNITED STATES PATENT AND TRADEMARK OFFICE
CERTIFICATE OF CORRECTION

PATENT NO. : 6,627,672 B1 Page 1 of 1
DATED : September 30, 2003
INVENTOR(S) : Lin et al.

It is certified that error appears in the above-identified patent and that said Letters Patent is hereby corrected as shown below:

Column 4,
Line 1, should read -- …carrier is desirably a reactive… --.
Line 2, should read -- …with the phosphine oxide. --.

Signed and Sealed this

Second Day of March, 2004

JON W. DUDAS
*Acting Director of the United States Patent and Trademark Office*